United States Patent
Sistla (10) Patent No.: US 8,230,018 B2
(45) Date of Patent: Jul. 24, 2012

(54) METHOD AND APPARATUS FOR PRESERVING CONFIDENTIALITY OF ELECTRONIC MAIL

(75) Inventor: Rajasekhar Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 09/851,625

(22) Filed: May 8, 2001

(65) Prior Publication Data
US 2003/0126463 A1 Jul. 3, 2003

(51) Int. Cl.
*G06F 15/16* (2006.01)
(52) U.S. Cl. ........ 709/206; 709/201; 709/217; 715/752; 713/166; 713/168; 713/169; 713/171
(58) Field of Classification Search .................. 709/206, 709/226, 9, 201, 217; 713/171, 168, 169, 713/166; 715/752
See application file for complete search history.

(56) References Cited

U.S. PATENT DOCUMENTS

| | | | |
|---|---|---|---|
| 6,625,734 B1 * | 9/2003 | Marvit et al. | 726/28 |
| 6,721,784 B1 * | 4/2004 | Leonard et al. | 709/206 |
| 6,760,704 B1 * | 7/2004 | Bennett | 704/270 |
| 6,775,382 B1 * | 8/2004 | Al-Salqan | 380/286 |
| 6,868,406 B1 * | 3/2005 | Ogg et al. | 705/60 |
| 6,941,454 B1 * | 9/2005 | Spraggs | 713/150 |
| 7,039,951 B1 * | 5/2006 | Chaudhari et al. | 726/7 |
| 7,293,175 B2 * | 11/2007 | Brown et al. | 713/166 |
| 2001/0042098 A1 * | 11/2001 | Gupta et al. | 709/206 |
| 2001/0054115 A1 * | 12/2001 | Ferguson et al. | 709/248 |
| 2002/0046092 A1 * | 4/2002 | Ostroff | 705/14 |
| 2002/0085710 A1 * | 7/2002 | Ananth | 380/37 |
| 2002/0099777 A1 * | 7/2002 | Gupta et al. | 709/206 |
| 2002/0136410 A1 * | 9/2002 | Hanna | 380/277 |
| 2002/0138445 A1 * | 9/2002 | Laage et al. | 705/67 |
| 2002/0143885 A1 * | 10/2002 | Ross, Jr. | 709/207 |
| 2002/0146096 A1 * | 10/2002 | Agarwal et al. | 379/88.13 |
| 2003/0009529 A1 * | 1/2003 | Powers | 709/206 |
| 2003/0023695 A1 * | 1/2003 | Kobata et al. | 709/206 |
| 2007/0016647 A1 * | 1/2007 | Gupta et al. | 709/206 |

* cited by examiner

*Primary Examiner* — Lan-Dai T Truong
(74) *Attorney, Agent, or Firm* — Caven & Aghevli LLC (57) ABSTRACT

A method and an apparatus for preserving confidentiality of an electronic mail are disclosed. One embodiment of the present invention, or an electronic mail confidentiality preserver of an email client, includes an input-processing engine and an encryption/decryption engine that is coupled to the input-processing engine. Based on a confidentiality level, the input-processing engine mainly limits abilities of a user of the email client to manipulate an electronic mail received by the email client. On the other hand, the encryption/decryption engine mainly limits the user's access to a local storage if the user's access involves an electronic mail.

21 Claims, 5 Drawing Sheets

METHOD AND APPARATUS FOR PRESERVING CONFIDENTIALITY OF ELECTRONIC MAIL

FIELD OF THE INVENTION

This invention relates to security technologies generally and particularly to their applications to electronic mails.

BACKGROUND OF THE INVENTION

Electronic mail (hereinafter email) has become a popular and in some cases, indispensable, communication tool for individuals and organizations. Despite its effectiveness for conveying information, email also poses security risks due to its inherent private or even confidential nature. For example, assuming company A has communicated with its bankers via emails regarding a buyout of company B, inability to maintain the confidentiality of these emails could potentially terminate the transaction and adversely affect company A's competitive position in its marketplace.

Some solutions have been proposed and implemented to preserve confidentiality of an email. One solution simply notifies a recipient of an email the confidentiality nature of email and assumes that the recipient would act appropriately and protectively of the email in response. Another solution assigns a password to the content of an email so that a recipient of the email can only read the content if he or she has the proper password.

The mentioned approaches have one major shortcoming. Specifically, an author of an email under either approach has no control over the email after the transmission of the email. As a result, when the recipient redistributes the content of that email to another without following the same security procedures as the author (i.e. notifying or assigning a password), the confidentiality of the email is no longer adequately protected. Another security breach could occur when the recipient saves the email to a floppy disk and subsequently loses the floppy disk.

As has been demonstrated, an improved method and an apparatus are needed to remedy the discussed shortcoming.

BRIEF DESCRIPTION OF THE DRAWINGS

The present invention is illustrated by way of example and is not limited by the figures of the accompanying drawings, in which like references indicate similar elements, and in which:

FIG. 1 illustrates a system configuration that one embodiment of the present invention, an electronic mail confidentiality preserver, resides in.

DETAILED DESCRIPTION

A method and an apparatus for preserving confidentiality of an electronic mail are disclosed. In the following description, numerous specific details are set forth in order to provide a thorough understanding of the present invention. However, it will be apparent to one of ordinary skill in the art that the invention may be practiced without these particular details. In other instances, well-known elements and theories such as client-server architecture, encryption and decryption technologies, multiple-thread programming, etc. have not been discussed in special details in order to avoid obscuring the present invention.

Figure 1:
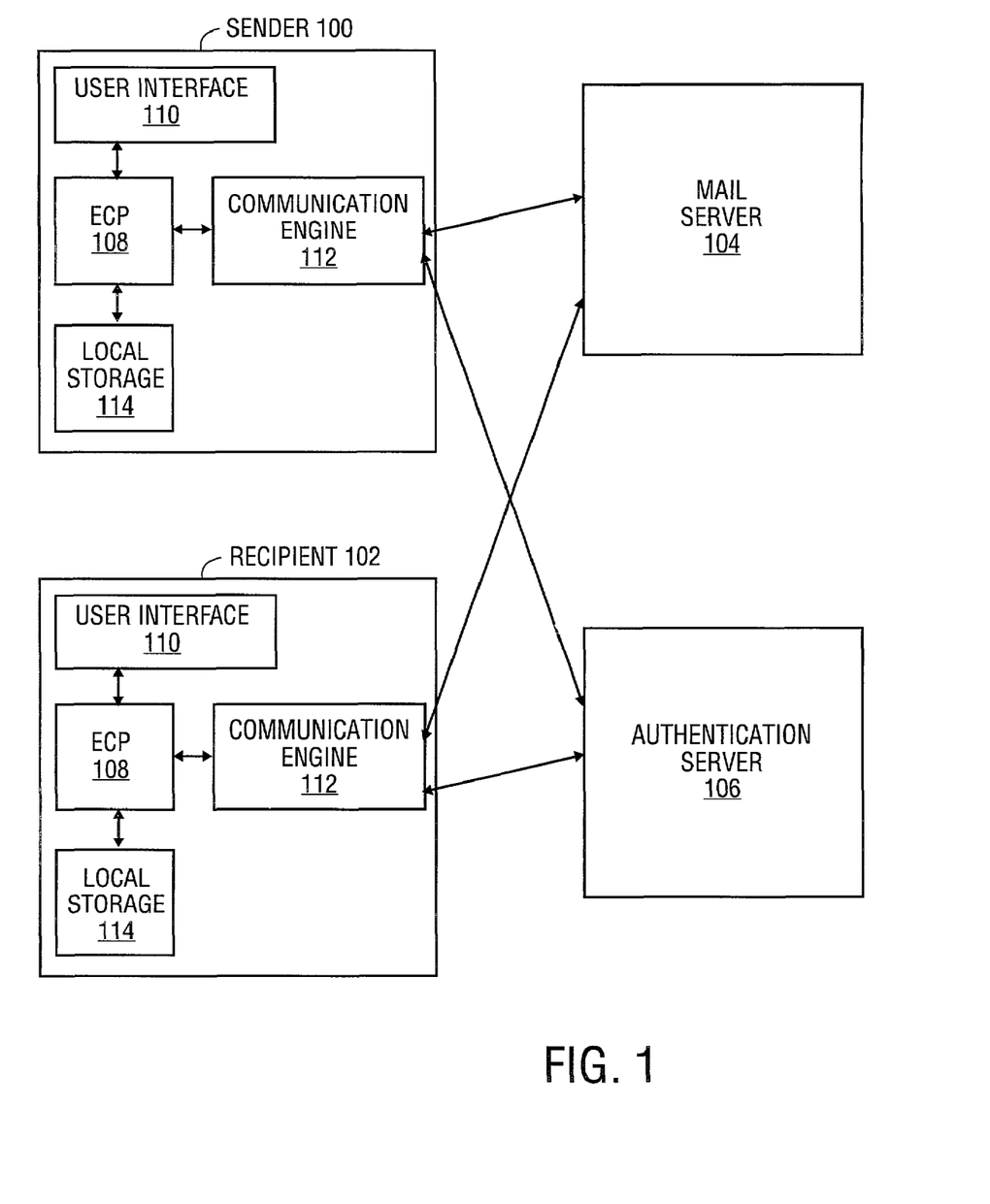

Throughout the following discussion, a machine readable medium refers to, but not limited to, a storage device, a memory device, a carrier wave, etc. The term, "electronic mail" (hereinafter email), refers to a text message that includes, but not limited to, a message header and/or an attachment. A message header often contains the subject matter, origination and destination information of an email. The origination and destination information generally refers to a user's email account information. An email server, such as mail server 104 as shown in FIG. 1, is responsible for maintaining such email account information and also for delivering an email to its destination based on the aforementioned destination information. On the other hand, an email client, such as sender 100 and recipient 102 as shown in FIG. 1, is mostly responsible for providing its users with capabilities to manipulate an email. Some examples of such capabilities are, but without limitation, reading, editing, creating, sending and storing an email.

An email client interacts with its user through user interface 110 and communicates with its mail server or authentication server through communication engine 112. Communication engine 112 adopts appropriate communication protocols so that its email client can establish and maintain connections with the corresponding servers. Additionally, an email client often includes local storage 114, such as a hard disk drive, floppy drive, a removable drive, etc. to store copies of emails. An email client can then access and manipulate these stored emails without having to maintain a connection with its mail server.

In conjunction with FIG. 1, the following sequence of exchanges further demonstrates the relationships among sender 100, recipient 102 and mail server 104 and the traveling path of an email from one email client to another. This example assumes that user A and user B have their email accounts with the same mail server 104, and user A uses sender 100 and user B uses recipient 102 to access their emails. In addition, user A and user B gain access to their email accounts after a successful verification of their identity information, such as, but not limited to, personal information, system password, etc. by authentication server 106.

User interface 110 of sender 100 provides user A with a text editor and a number of menu options. User A composes an email that is intended for user B with the text editor. The message header of the email contains both the previously mentioned origination information, such as user A's email account information (A@this_domain.com), and the destination information, such as user B's email account information (B@this_domain.com).

a. Then in response to user A's selection from one of the menu options to send the email, communication engine 112 of sender 100 relays A@this_domain.com, B@this_domain.com, and the content of the email to mail server 104.

b. Mail server 104 formats and stores the information that it has received in a file for user B (or hereinafter user_B_file).

c. After user B gains access to mail server 104 via recipient 102, recipient 102 requests mail server 104 for a copy of user_B_file on behalf of user B through communication engine 112.

d. Recipient 102 parses user_B_file for display via its user interface 100.

In one embodiment of the present invention, or email confidentiality preserver (hereinafter ECP) 108 as shown in FIG. 1, ECP 108 resides within sender 100 and recipient 102. Alternatively, ECP 108 may reside in a standalone apparatus that is coupled to either sender 100 or recipient 102. ECP 108 primarily provides security services for sender 100 and recipient 102.

Figure 2:
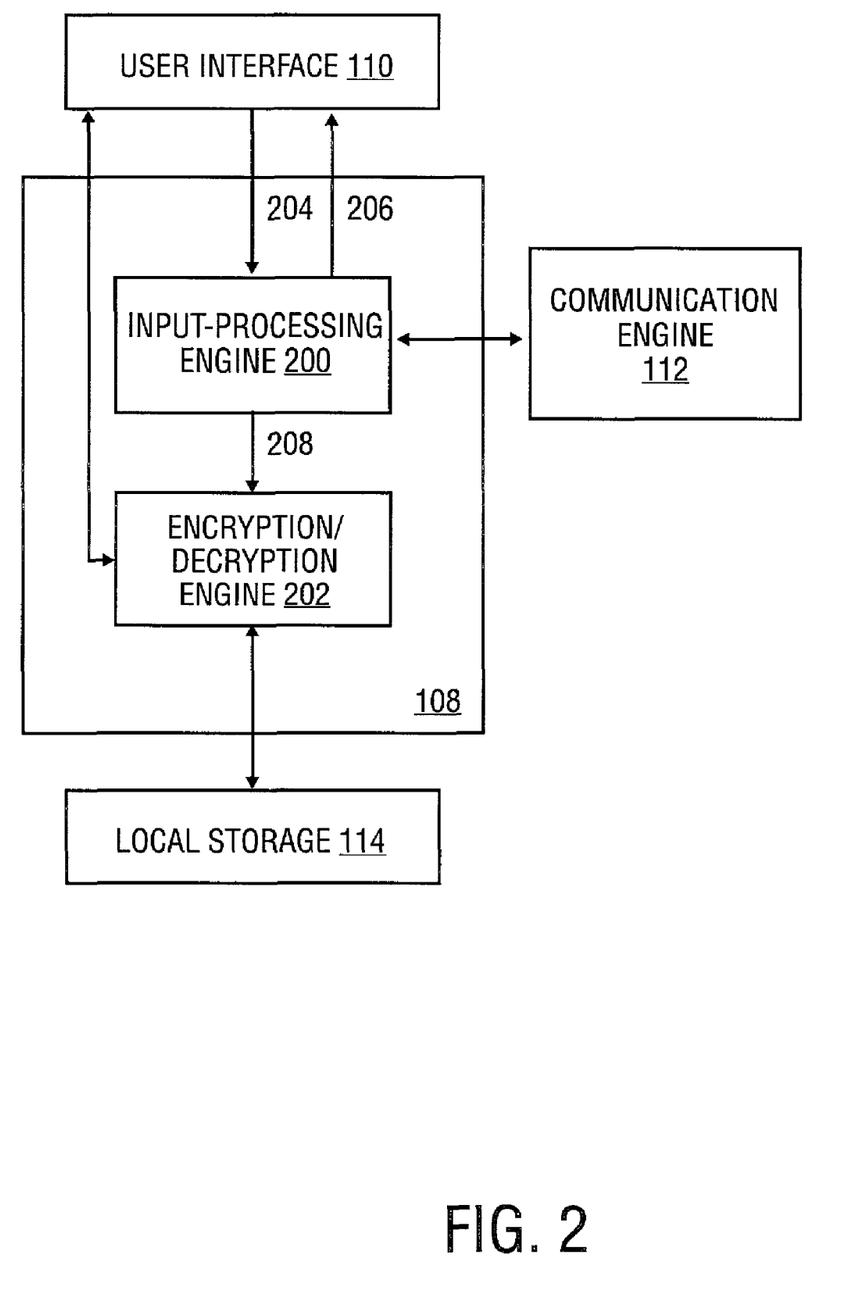
FIG. 2 illustrates a block diagram of one embodiment of an electronic mail confidentiality preserver.

FIG. 2 illustrates a block diagram of one embodiment of ECP 108. In particular, ECP 108 contains input-processing engine 200 and encryption/decryption engine 202. Before sender 100 transmits an outgoing email to mail server 104, input-processing engine 200 formats the email according to user input information 204 of the email. On the other hand, after recipient 102 receives an incoming email, either through communication engine 112 or from local storage 114, input-processing engine 200 might assert control signal 206 to disable certain options of user interface 110 and/or assert control signal 208 to invoke encryption/decryption engine 202. Subsequent sections will discuss the assertion of these control signals and the formatting of the email in more details.

Figure 3:
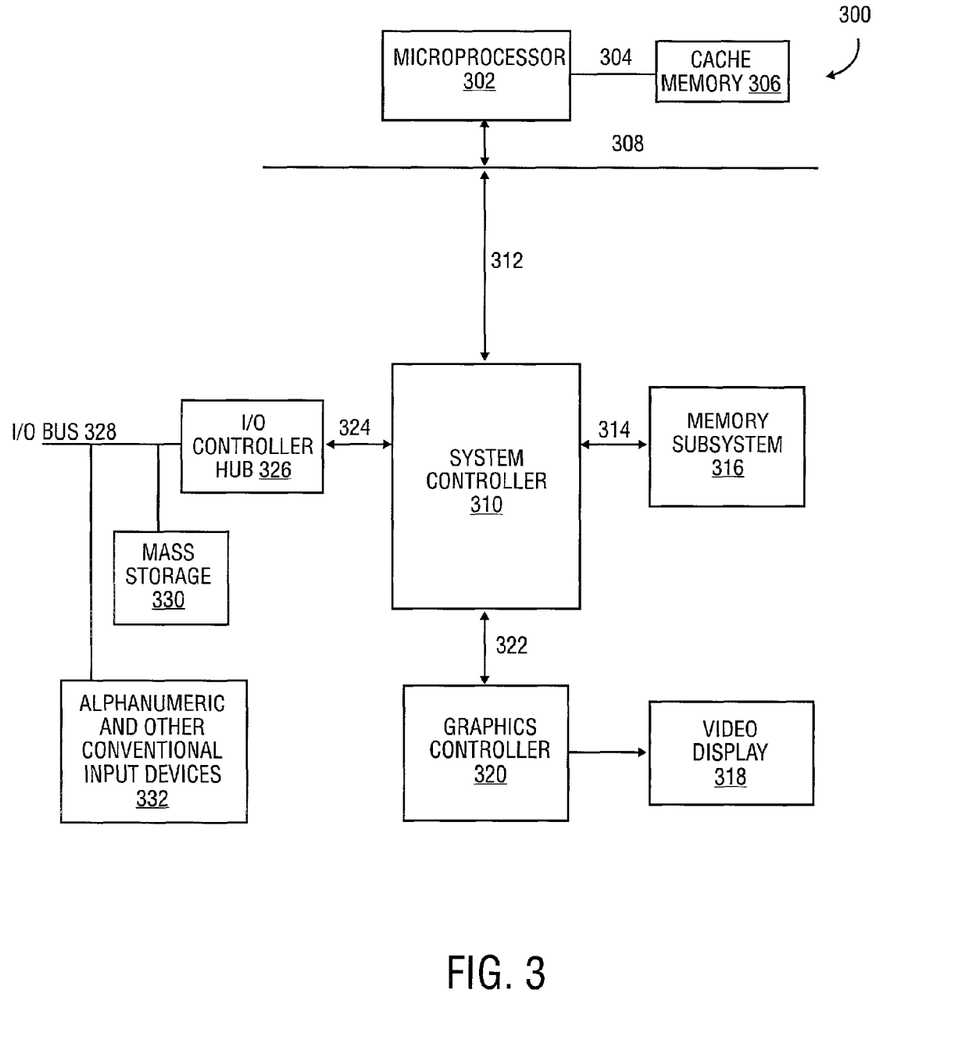
FIG. 3 illustrates a general purpose computer system.

Some examples of sender 100, recipient 102, mail server 104 and authentication server 106 are, but not limited to, add-in circuit boards, standalone electronic apparatuses and general-purpose computer systems. A general-purpose computer system 300 is illustrated in FIG. 3.

The general-purpose computer system architecture comprises microprocessor 302 and cache memory 306 coupled to each other through processor bus 304. Sample computer system 300 also includes high performance system bus 308 and standard I/O bus 328. Coupled to high performance system bus 308 are microprocessor 302 and system controller 310. Additionally, system controller 310 is coupled to memory subsystem 316 through channel 314, is coupled to I/O controller hub 326 through link 324 and is coupled to graphics controller 320 through interface 322. Coupled to graphics controller is video display 318. Coupled to standard I/O bus 328 are I/O controller hub 326, mass storage 330 and alphanumeric input device or other conventional input device 332.

These elements perform their conventional functions well known in the art. Moreover, it should have been apparent to one ordinarily skilled in the art that computer system 300 could be designed with multiple microprocessors 302 and may have more components than that which is shown. Also, mass storage 320 may be used to provide permanent storage for the executable instructions of ECP 108 and as local storage 114 in one embodiment, whereas memory subsystem 316 may be used to temporarily store the executable instructions during execution by microprocessor 302.

Operations of an Email Confidentiality Preserver

Figure 4A:
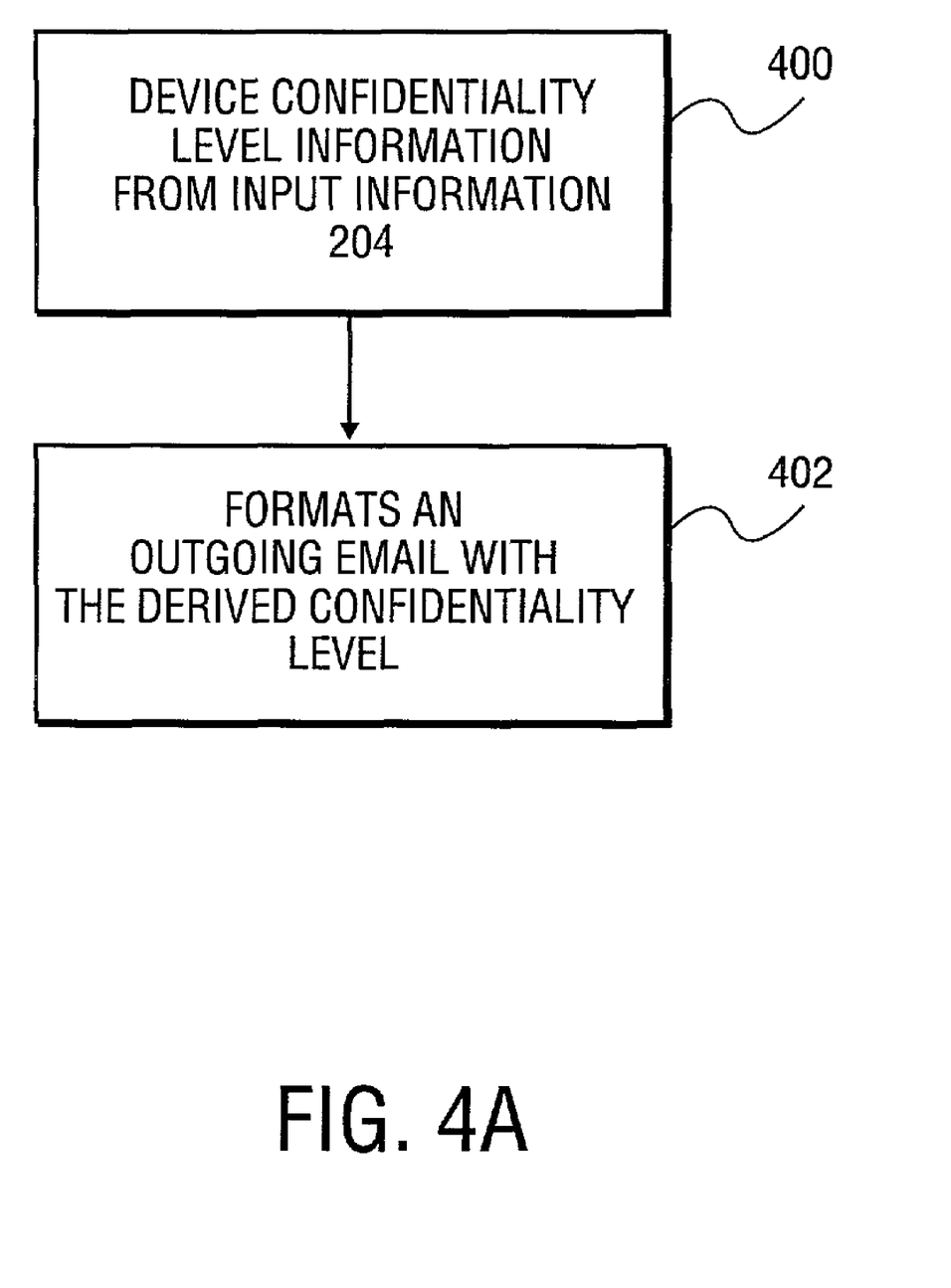
FIG. 4(a) illustrates a flow chart of one process that one embodiment of the present invention follows to prepare an electronic mail for transmission.

FIG. 4(*a*) describes a flow chart of one process that one embodiment of ECP 108 follows to prepare an email for transmission. Specifically, using FIG. 1 and the same example involving user A and user B as discussed above, user interface 110 of one embodiment of sender 100 provides user A with varying confidentiality levels to select from. For example, user interface 110 could include a menu with three confidentiality levels: high, medium and low. In response to the level that user A selects for a particular outgoing email in block 400, or user input information 204 as shown in FIG. 2, input-processing engine 200 formats the outgoing email in block 402.

More particularly, one embodiment of input-processing engine 200 sets an alert flag that indicates the selected confidentiality level, appends the alert flag to the email and presents the formatted email to communication engine 112. In one implementation, the alert flag contains a numerical value that corresponds to a confidentiality level. A "high" confidentiality level may correspond to number 3, "medium" to 2 and "low" to 1. It should however be apparent to one with ordinary skill in the art to utilize any integer number of confidentiality levels and to assign any numerical value to each of these levels, as long as one level is distinguishable from another, to implement the present invention.

Figure 4B:
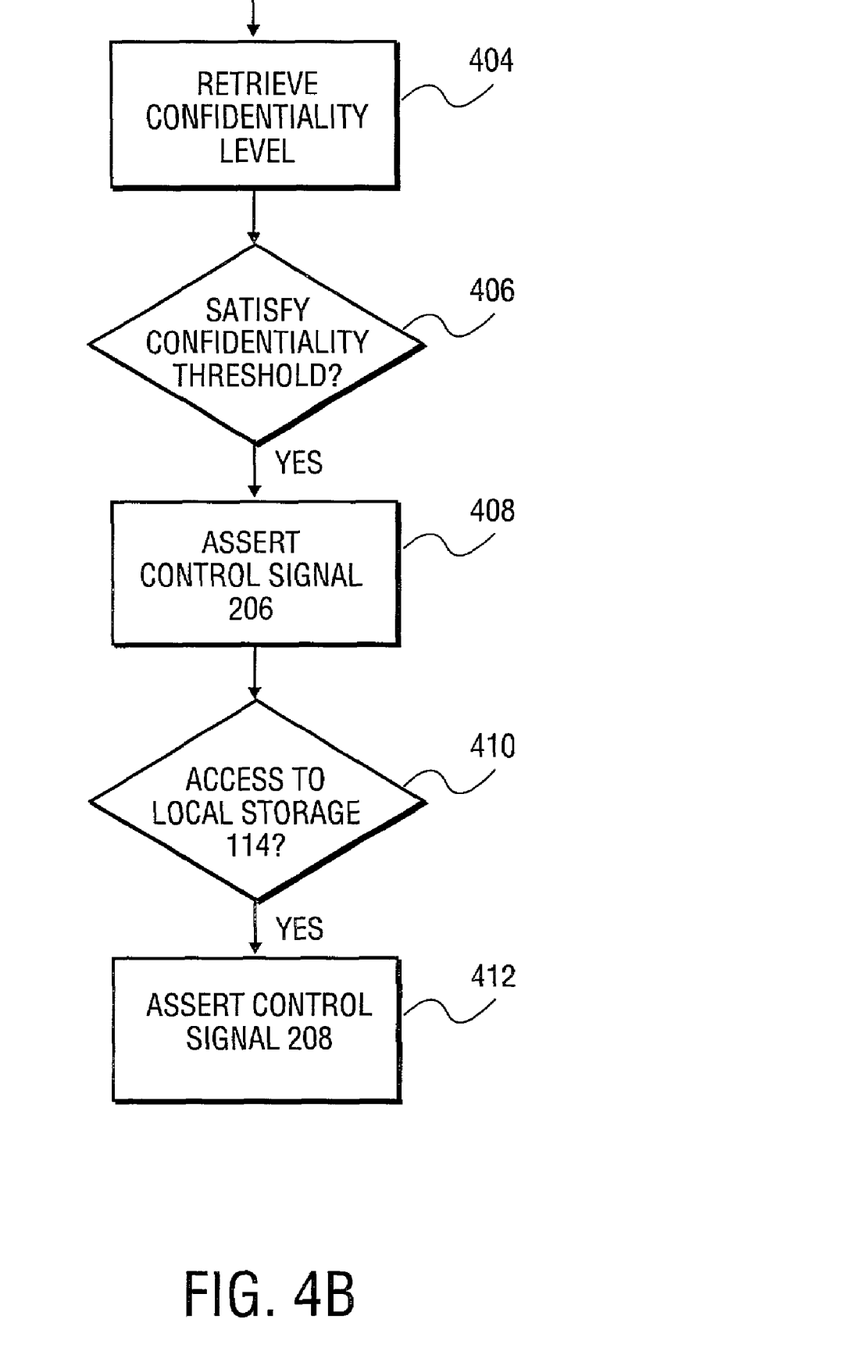
FIG. 4(b) illustrates a flow chart of one process that one embodiment of the present invention follows after having received an email.

FIG. 4(*b*) illustrates a flow chart of one process that one embodiment of ECP 108 follows after its email client receives an email. Thus, in conjunction with FIGS. 1 and 2, after recipient 102 receives an email via its communication engine 112, input-processing engine 200 extracts the user-selected confidentiality level from the aforementioned alert flag in block 404. If the extracted information satisfies a confidentiality threshold in block 406, input-processing engine 200 then asserts control signal 206 in block 408, which causes user interface 110 to limit user B's ability to manipulate the received email. For instance, user interface 110 may disable certain menu options and their associated keystroke shortcuts that are initially available to user B. Some examples are, but not limited to, "save to disk", "copy/cut", "forward", etc. User interface 110 may also prevent user B from editing the content of the received email, replying the email with the content intact, removing confidentiality setting of the email, etc.

The confidentiality threshold mentioned above can be a numerical value that input-processing engine 200 predefines. Using the same numbering scheme discussed above (i.e. high confidentiality level=3, medium=2 and low=1) as an illustration, input-processing engine 200 may preset a confidentiality threshold at 2 and assert control signal 206 if the confidentiality level of the received email exceeds 2. It should however be apparent to one of ordinary skill in the art to use a different numbering scheme and to impose a different condition for satisfying confidentiality threshold than the one disclosed above without exceeding the scope of the present invention.

Furthermore, one embodiment of input-processing engine 200 could also assert a confidentiality-level-dependent control signal 206. More specifically, input-processing engine 200 could perform the following:

| Action | Confidentiality level of a received email | Consequences |
| --- | --- | --- |
| Assert one distinct control signal 206 | 3 | Disable all the options in user interface 110 that could be disabled by control signal 206 |
| Assert another distinct control signal 206 | 2 | Disable some of the options in user interface 110 that could be disabled by control signal 206 |
| Assert yet another distinct control signal 206 | 1 | All the options in user interface 100 remain available |

In block 410, input-processing engine 200 looks for attempts by its email client to access local storage 114 as shown in FIG. 1 and FIG. 2. In one embodiment, user interface 110 informs input-processing engine 200 of such an attempt via input information 204. Any of the following actions by a user, but not limited to, would trigger user interface 110 to notify input-processing engine 200: selecting the "export" option, selecting "save to disk" option, copying a folder that contains received emails to local storage 114, etc. If an attempt to access local storage 114 is established, input-processing engine 200 proceeds to assert control signal 208 in block 412, which invokes encryption/decryption engine 202.

Although block 406 precedes block 410 in FIG. 4(*b*), an ordinarily skilled artisan can practice the present invention without following that illustrated sequence. For example, the ordinarily skilled artisan may implement input-processing engine 200 using multiple threads. Particularly, one thread executes instructions for blocks 404, 406 and 408, and the other thread executes instructions for blocks 410 and 412. Either thread can proceed without waiting for the completion of the other thread's execution.

In response to the asserted control signal 208, one embodiment of encryption/decryption engine 202 prompts its user for some identity information via user interface 110. One such identity information is the user's system password, which uniquely identifies the user's email client. If the attempted access to local storage 114 in block 410 were to store information, encryption/decryption engine 202 then encrypts the email that was involved in the attempted access using the obtained identity information. On the other hand, if the attempted access were to retrieve information, then encryption/decryption engine 202 uses the identity information from its user to decrypt the email. In other words, ECP 108 ensures that any emails or folders containing emails that are stored in local storage 114 are further protected by the identity information of its user. Also, it should be noted that encryption/decryption engine 202 may utilize any existing or future encryption/decryption standards and yet still remain within the scope of the present invention.

Thus, a method and an apparatus for preserving confidentiality of an electronic mail have been disclosed. Although an email confidentiality preserver has been described particularly with reference to the figures and to specific examples, it will be apparent to one of ordinary skill in the art that the email confidentiality preserver may appear in any of a number of other system configurations. It is further contemplated that many changes and modifications may be made by one of ordinary skill in the art without departing from the spirit and scope of the present invention.

The invention claimed is:

1. A method for preserving confidentiality of an electronic mail from a sender to a recipient, comprising:
    authenticating identity information of the recipient based on data provided by an authentication server;
    restricting the recipient's ability to modify contents of the electronic mail, from a mail server, based on a confidentiality level established by the sender, wherein a user interface is to comprise a first set of confidentiality levels from which the sender is to select and wherein an alert flag is appended to the electronic mail in response to the user selection;
    encrypting the electronic mail, at the recipient, with the authenticated identity information if the recipient attempts to store the electronic mail to a local storage; and
    decrypting the electronic mail, at the recipient if the recipient attempts to retrieve the electronic mail from the local storage,
    wherein the sender and the recipient are each directly coupled to communicate with both the authentication server and the mail server.

2. The method according to claim 1, wherein the identity information is a system password.

3. The method according to claim 1, the method further comprising:
    prompting a user of the recipient to supply the identity information;
    decrypting the electronic mail with the identity information supplied by the user.

4. The method according to claim 1, the method further comprising:
    asserting a control signal to disable options that are originally supported by the recipient if the confidentiality level satisfies a predefined confidentiality threshold.

5. The method according to claim 4, wherein the control signal is a control signal.

6. An electronic mail confidentiality preserver of a recipient email client, comprising:
    an input-processing engine circuitry to limit abilities of a user of the recipient email client to modify contents of an electronic mail received from a mail server by the recipient email client based on a confidentiality level established by a sender email client, wherein a user interface, included in the sender email client, further comprises a first set of confidentiality levels from which a user of a sender email client is to select, and wherein an alert flag is to be appended to the electronic mail in response to the user selection; and
    an encryption/and decryption engine circuitry, coupled to the input-processing engine, to encrypt the electronic mail with authenticated identity information based on data provided by an authentication server if the recipient attempts to store the electronic mail to a local storage;
    wherein the sender email client and the recipient email client are each directly coupled to communicate with both the authentication server and the mail server.

7. The electronic mail confidentiality preserver according to claim 6, the input-processing engine further asserts a first control signal to disable options that are originally supported by the recipient email client if the confidentiality level satisfies a predefined confidentiality threshold.

8. The electronic mail confidentiality preserver according to claim 7, wherein the first control signal is a control signal.

9. The electronic mail confidentiality preserver according to claim 6, the input-processing engine further asserts a second control signal to invoke the encryption/and decryption engine in response to the user's access.

10. The electronic mail confidentiality preserver according to claim 6, the encryption/and decryption engine further:
    prompts the user for identity information;
    if the user's access to the local storage is to store the electronic mail, encrypts the electronic mail with the identity information; and
    if the user's access to the local storage is to retrieve the electronic mail, decrypts the electronic mail with the identity information.

11. A electronic mail client, comprising:
    a user interface;
    a communication engine;
    a local storage memory; and
    an electronic mail confidentiality preserver, coupled to the user interface, coupled to the communication engine and coupled to the local storage memory, wherein the electronic mail confidentiality preserver further comprises:
    an input-processing engine circuitry to limit abilities of a user of the recipient email client to modify contents of an electronic mail received at the recipient email client from a sender through a mail server based on a user-selected confidentiality level established by the sender; and an encryption/and decryption engine circuitry, coupled to the input-processing engine circuitry, to encrypt the electronic mail with authenticated identity information based on data provided by an authentication server if the recipient email client attempts to store the electronic mail to a local storage, wherein a user interface included in the sender further comprises a first set of confidentiality levels from which a user is to select and wherein an alert flag is to be appended to the electronic mail in response to the user selection, wherein the sender and the recipient email client are each directly coupled to communicate with both the authentication server and the mail server.

12. The electronic mail client according to claim 11, wherein the user interface further comprises
 a second set of options to manipulate the electronic mail from which the user is to select.

13. The electronic mail client according to claim 12, wherein the electronic mail confidentiality preserver further asserts a first control signal to the user interface to disable selected options from the second set of options if the confidentiality level satisfies a predefined confidentiality threshold.

14. The electronic mail client according to claim 13, wherein the first control signal is a control signal.

15. The electronic mail client according to claim 12, the input-processing engine circuitry further asserts a second control signal to invoke the encryption/and decryption engine in response to the user's access.

16. The electronic mail client according to claim 12, the encryption/and decryption engine further:
 prompts the user for identity information;
 if the user's access to the local storage is to store the electronic mail, encrypts the electronic mail with the identity information; and
 if the user's access to the local storage is to retrieve the electronic mail, decrypts the electronic mail with the identity information.

17. A storage memory storing a plurality of instructions readable therefrom, the instructions, when executed by a computer system, cause the computer system to perform operations comprising:
 authenticating identity information of a recipient of an electronic mail based on data provided by an authenticating server;
 restricting the recipient's ability to modify contents of the electronic mail; from a mail server, based on a confidentiality level established by a sender of the electronic mail, wherein a user interface is to comprise a first set of confidentiality levels from which the sender is to select and wherein an alert flag is appended to the electronic mail in response to the user selection;
 encrypting the electronic mail with the authenticated identity information if the recipient attempts to store the electronic mail to a local storage; and
 decrypting the electronic mail if the recipient attempts to retrieve the electronic mail from the local storage;
 wherein the sender and the recipient are each directly coupled to communicate with both the authentication server and the mail server.

18. The storage memory according to claim 17, wherein the identity information is a system password.

19. The storage memory according to claim 17, the instructions further comprising: prompting a user of the recipient to supply the identity information; decrypting the electronic mail with the identity information supplied by the user.

20. The storage memory according to claim 17, the instructions further comprising: asserting a control signal to disable options that are originally supported by the recipient if the confidentiality level satisfies a predefined confidentiality threshold.

21. The storage memory according to claim 20, wherein the control signal is a control signal.

* * * * *

UNITED STATES PATENT AND TRADEMARK OFFICE
CERTIFICATE OF CORRECTION

PATENT NO.      : 8,230,018 B2
APPLICATION NO. : 09/851625
DATED           : July 24, 2012
INVENTOR(S)     : Rajasekhar Sistla It is certified that error appears in the above-identified patent and that said Letters Patent is hereby corrected as shown below:

In column 6, line 42, in claim 9, after "claim 6," insert -- wherein --.

In column 6, line 46, in claim 10, after "claim 6," insert -- wherein --.

In column 7, line 26, in claim 15, after "claim 12," insert -- wherein --.

In column 7, line 30, in claim 16, after "claim 12," insert -- wherein --.

In column 8, line 9, in claim 17, delete "mail;" and insert -- mail, --, therefor.

Signed and Sealed this
Twenty-third Day of October, 2012

David J. Kappos
*Director of the United States Patent and Trademark Office*